United States Patent [19]
Kreissler

[11] 3,800,922
[45] Apr. 2, 1974

[54] ADJUSTMENT MECHANISM FOR TORQUE TRANSMITTING AND LOAD LIMITING DEVICE

[75] Inventor: Ralph L. Kreissler, Rockford, Ill.

[73] Assignee: Sundstrand Corp., Rockford, Ill.

[22] Filed: Jan. 26, 1973

[21] Appl. No.: 326,992

[52] U.S. Cl. ................................ 188/134, 192/8 C
[51] Int. Cl. .............................................. B60t 7/12
[58] Field of Search ............ 188/134; 192/6 R, 8 R, 192/8 C

[56] References Cited
UNITED STATES PATENTS
| | | | |
|---|---|---|---|
| 1,934,790 | 11/1933 | Brownlee | 188/134 UX |
| 2,458,441 | 1/1949 | Starkey | 192/8 C |
| 3,701,401 | 10/1972 | Palma et al. | 188/134 |

Primary Examiner—Duane A. Reger
Attorney, Agent, or Firm—Paul H. Gallagher

[57] ABSTRACT

A torque transmitting and load limiting device including a coil spring serving as the principal torque transmitting member. When normal torque is transmitted, the coil spring engages an inner member, but when an excessive load is encountered, it expands and engages an outer member, producing a braking action. The coil spring is tapered, and means is included for adjustably varying the value, or point, considered radially, at which the braking action takes place. The adjustment is made by means of a threaded adjusting means. The device is designed so that it can be used with the input member and the output member respectively at opposite ends of the device and for either direction of rotation.

11 Claims, 5 Drawing Figures

PATENTED APR 2 1974

ADJUSTMENT MECHANISM FOR TORQUE TRANSMITTING AND LOAD LIMITING DEVICE

FIELD OF THE INVENTION

The invention resides in the field of a torque transmitting and load limiting device of the broad character having a coil spring which is a principal torque transmitting element, and is of the character wherein the coil spring acts as a torque limiting element, or brake, upon a certain load or reaction being reached.

OBJECTS OF THE INVENTION

A broad object of the invention is to provide a torque transmitting or load limiting device of the foregoing general character having novel means for adjusting the value at which the coil spring becomes a brake instead of a torque transmitting element.

A further object is to provide a device of the foregoing character wherein the adjusting means utilizes a tapered coil spring whereby the adjustments are accomplished.

A still further object is to provide a device of the foregoing character, having a tapered coil spring which is utilized for effecting adjustments of the kind referred to, and with the further feature, in one form of the invention, in which the turns or convolutions of the coil spring vary in radial thickness whereby to provide substantially uniform expansion and contraction effect throughout the length of the coil spring, in compensation for the otherwise tendency for the expansion and contraction to be greater at the larger end of the coil spring than at the smaller end.

DESCRIPTION OF A PREFERRED EMBODIMENT

The nature and construction of the device are such that the input element and output element can be selectively at respectively opposite ends, with a corresponding coil spring of predetermined diameter and internal bias. This feature of the device will be referred to hereinbelow, but for convenience in the detail description of the device, one end will be consistently referred to as the input end, and the other as the output end.

Figure 1:
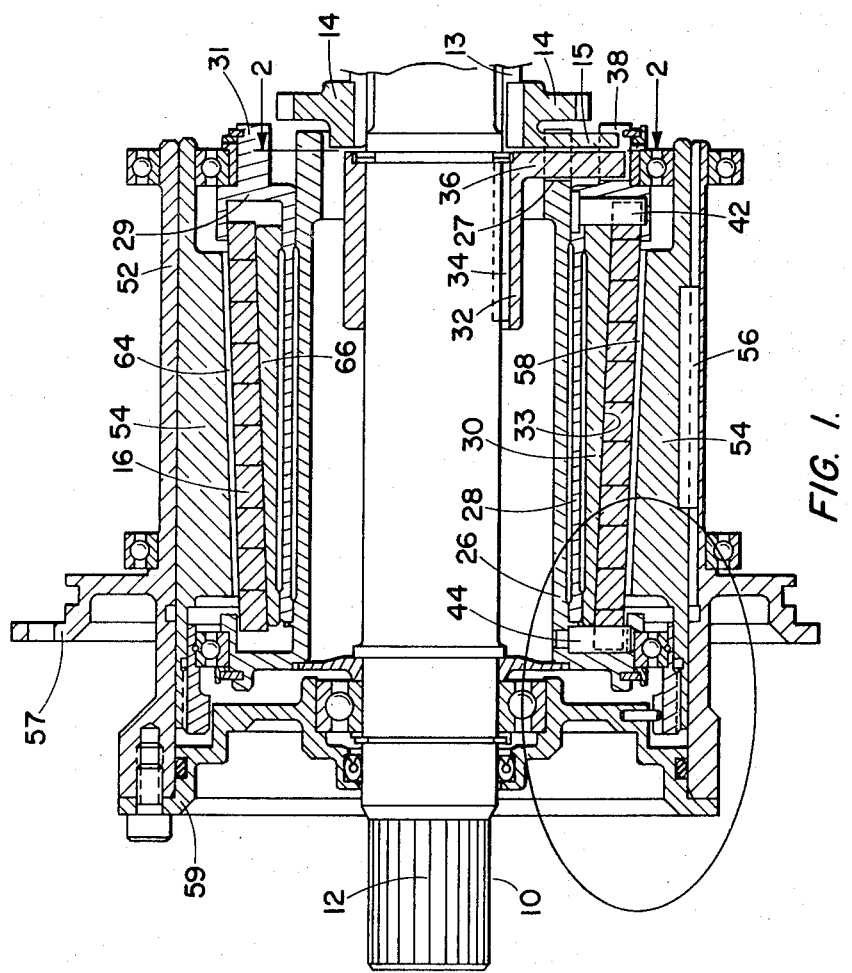
FIG. 1 is an axial sectional view of one form of the device of the invention.
Figure 5:
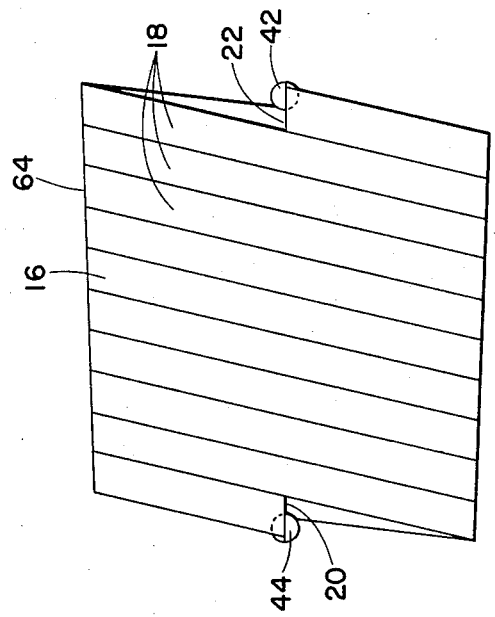
FIG. 5 is an elevational view of the coil spring of FIG. 1 or FIG. 4 showing its outer surface.

Referring in detail to the drawings, attention is directed first to FIG. 1 showing one form of the torque transmitting and load limiting device. The device includes, in the assumed direction of torque transmission, an input element 10 in the form of a central shaft having an external terminal element 12 for connection to an input source. The device also includes an output element 14 of suitable character, which may be for example a gear, and having a radial finger 15 which constitutes an element in the torque transmission as will be referred to again hereinbelow. The gear 14 may be keyed, as by a key 13, to other elements or components to be driven. Between the input element and the output element, is a tapered coil spring 16 which serves as a principal medium for transmitting the torque from the input element to the output element, and the means for producing a braking action. The spring 16 is shown in elevational view in FIG. 5, and in that view the spring in both forms of the device (FIGS. 1 and 4) appear the same, although they are structurally different, as referred to hereinbelow. The spring 16 includes a plurality of turns or convolutions 18 terminating in end faces 20, 22 facing circumferentially in opposite directions.

Mounted on the shaft 10 and constituting an element on the input side of the device is a sleeve 32 keyed to the shaft as by a key 34 for rotation therewith. This sleeve has a radial arm 36 adjacent the finger 15, both this arm and finger extending through slots in elements described hereinbelow.

Figure 2:
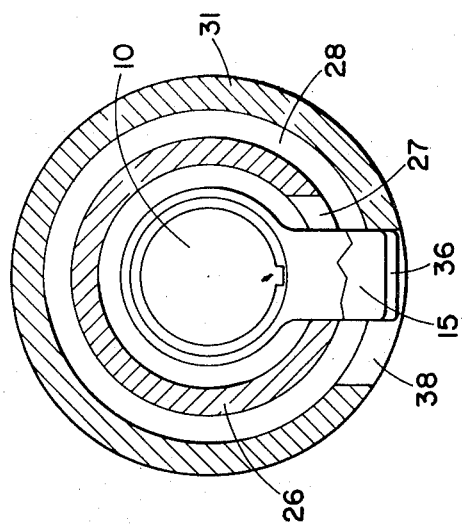
FIG. 2 is a sectional view taken substantially at line 2—2 of FIG. 1.

Surrounding the shaft 10 and concentric therewith is a sleeve 26 having a circumferential slot 27 receiving the arm 36 and finger 15 (see also FIG. 2). Surrounding the sleeve 26 is another sleeve 28, having a radial flange 29, the latter having an axial extension 31 which in turn has a circumferential slot 38, this slot being positioned close to the slot 27, but at times being offset therefrom depending upon the details of operation of the device as described below. Surrounding the sleeve 28 is another sleeve 30 directly next to the coil spring and constituting an inner element normally engaged by the spring, when the latter is in collapsed or contracted condition, as it normally is, again as referred to hereinbelow.

Mounted in the sleeve 28 is a radial pin 42 which engages the corresponding end surface 22 of the coil spring 16 at one end (see also FIG. 5), and engaging the end surface 20 of the coil spring at the other end is a radial pin 44 secured in the sleeve 26.

As noted above, the coil spring is tapered and in the form shown in FIG. 1 it is tapered both on the outer surface and the inner surface, and the turns of the spring are of uniform radial thickness. The sleeve 30 has an outer surface 33 that is tapered complementally to the inner surface of the coil spring for uniform engagement throughout the length of the spring.

Surrounding the coil spring is an inner housing element 54 having an inner surface 58 tapered complementally to the outer surface of the coil spring, for engagement thereby but normally spaced therefrom, but serving as a braking surface upon excessive expansion of the coil spring, the tapered shape enabling uniform engagement therewith throughout the length of the spring.

Figure 3:
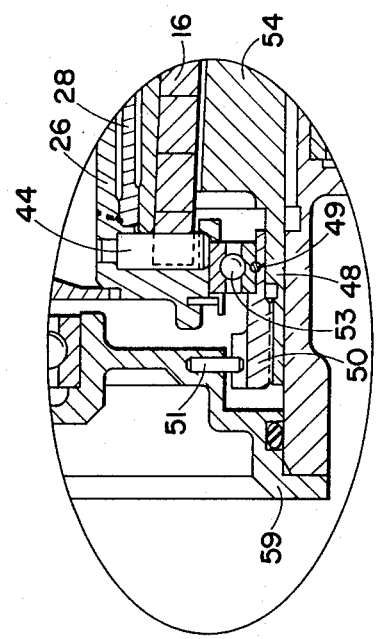
FIG. 3 is a relatively large scale view of the portion of FIG. 1 encircled at the lower left hand corner of the latter figure.

The inner housing element 54 is mounted in an outer housing 52 by which the whole device is mounted on an appropriate support, such as by a flange 57, the outer housing being closed at one end by a head member 59 fixed thereto. The inner housing element 54 is keyed to the outer housing 52 as by a key 56 retaining the housing element 54 against rotation but enabling it to be moved or shifted axially for adjustment purposes. The inner housing element has an axial flange 48 (FIG. 3) having threaded engagement with a collar 50 held against rotation by a pin 51 mounted in the fixed head member 59. The collar 50 is held against axial shifting by a ring 49 acting through a bearing 53 held fixed in axial direction with the inner sleeve 26.

In the normal operation of the device, in the assumed direction of transmitting the torque through the device, the chain of drive is: input shaft 10, sleeve 32 with the arm 36, the axial flange 29 and sleeve 28, the pin 42, the coil spring itself 16, the pin 44, the sleeve 26, finger 15, output element 14, and additional elements therebeyond to be driven. The individual elements making up the device, other than the coil spring 16, may be as desired and need not have detail description, except that they are shaped and proportioned to accommodate the shape of the coil spring. As mentioned above, the coil spring in the device of FIG. 1, is tapered both on the outer surface and the inner surface, and the turns or convolutions are of uniform radial thickness. The coil spring is dimensioned, and self-biased, so that in normal condition and with normal drive being transmitted therethrough, it is contracted or collapsed against the sleeve 30. In normal operation the coil spring and sleeve together form a mutually fixed and effectively solid drive transmitting component, i.e., they both together rotate as a single element, and in encountering normal loads, the spring does not expand and lift off of the sleeve, but when an excessive load is encountered, the reaction produces expansion thereof and it then engages the inner housing element 54, and a torque limiting, or braking, action is produced, thus preventing further rotation.

The tapered construction of the coil spring enables adjustment of the value of the spring, or the point at where the braking action takes place, so as to produce a torque limiting or braking action at selectively different points. For example, upon removing the head member 59, the collar 50 can be rotated, and through the threaded connection with the inner housing element 54, the latter is shifted axially. This varies the effective radial spacing between the inner housing element 54 and the coil spring, for correspondingly varying the point at which the braking action takes place according to the expansion of the spring, it being understood that if the inner housing element 54, as viewed in FIG. 1, is shifted to the right, the spacing will be less and the braking action will take place at a lesser degree of expansion, and of course if it is shifted to the left, an opposite effect will be achieved.

There are many applications in which a device of this general type is used, and it is well known that such a device that has only a single value in expansion and braking action, is limited in its application. It often is found that a different value is desired, than first calculated, and in devices known heretofore, it has been necessary to completely replace the device for providing a different value, while in the present instance the adjustment enables a different value to be provided in a single device. It is also desired, at times, to provide a different value than the nominal or optimum value, such as to provide a higher value or a lower value than that, for various purposes. The device of the present invention enables the provision of such other values, and facilitates treatment of the problem involved after having determined the optimum value, in that it is not necessary to make the device having exactly that optimum value, which was a serious disadvantage in connection with devices heretofore known.

Figure 4:
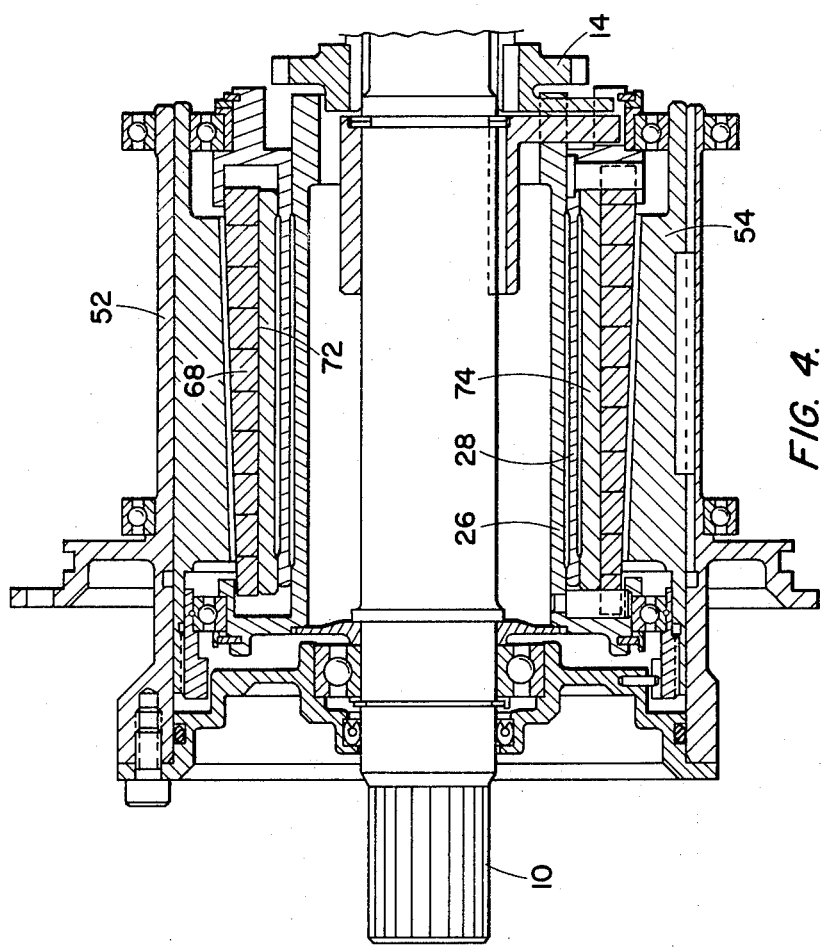
FIG. 4 is a view similar to FIG. 1 but showing a modified form of the device.

FIG. 4 includes a device utilizing a coil spring 68 which is similar to the spring 16 of FIG. 1, in that it is tapered, but in the present instance the coil spring decreases in radial thickness from its large end to its small end. The outer surface is tapered and it may have a taper of the same slope as the coil spring 16 with the inner surface 72 substantially cylindrical. It is not critical that the inner surface be cylindrical, but on the other hand if that surface is to be tapered, it would be tapered at a different angle from the outer surface to provide the decrease in thickness mentioned. The outer surface of the sleeve 74 which corresponds with the sleeve 30 of course conforms to the inner surface of the coil spring.

In a tapered coil spring, there is a tendency for the turns at the large end to expand to a greater extent than the turns at the small end, but this tendency is overcome by the provision of the lesser radial thickness at the small end. The amount of decrease in thickness of the coil spring would be as desired according to practical considerations, and the present invention is not limited to any certain amount of decrease. The construction of the device of FIG. 4 generally is the same as that of FIG. 1 with the exception of the shape of the elements having to do with the decrease in thickness of the coil spring.

FIG. 2 shows the arrangement in which the coil spring is normally maintained in relatively rigid condition, so as to respond immediately to the movement of the input member, this being produced by the elimination of play. The arm 36 and finger 15 extend through the slots 27, 38 as referred above, the slots being of greater circumferential extent than the arm and finger, and the coil spring biases the sleeves 26 and 28 to the positions shown, i.e., with the sleeves engaging the arm and finger on opposite sides.

I claim:

1. A torque transmitting and load limiting device, comprising,
   an input member,
   an output member,
   a torque transmitting member in the form of a coil spring having end surfaces facing circumferentially in opposite directions,
   the input member and output member having elements respectively engaging said end surfaces,
   a non-rotatable outer element surrounding the coil spring,
   the coil spring being arranged so that when excessive torque is transmitted therethrough it expands and friction-engages the outer element and produces a braking action,
   said coil spring and outer element having correspondingly tapered surfaces, and
   means for adjusting the radial distance between the coil spring and outer element to correspondingly vary the point at which the coil spring engages the outer element according to a predetermined torque.

2. A device according to claim 1 wherein said coil spring and outer element have correspondingly tapered surfaces.

3. A device according to claim 1 wherein said adjusting means includes means for moving the outer element axially relative to said spring.

4. A device according to claim 1 wherein the means for adjusting the relation between the spring and the outer element includes means for adjusting the effective radial spacing between the coil spring and the outer element.

5. A device according to claim 4 wherein the coil spring is of uniform thickness in radial direction throughout the axial length thereof.

6. A device according to claim 4 wherein the thickness of the coil spring, in radial direction, decreases from one end to the other in axial direction.

7. A device according to claim 6 wherein one of the inner surface/outer surface of the coil spring is tapered and the other surface is substantially cylindrical.

8. A device according to claim 7 wherein the outer surface of the coil spring is tapered, and the inner surface is substantially cylindrical.

9. A device according to claim 1 which includes an outer housing by which the device is mounted with the outer housing secured against movement, and the outer element, which constitutes the element that is not normally engaged by the spring, is mounted in the outer housing against rotation, but adjustable axially.

10. A device according to claim 1 wherein the input element includes a central shaft, and the device includes a pair of sleeves surrounding the shaft, and the sleeves respectively have radial pins engaging corresponding ends of the coil spring, and said sleeves are respectively connected with the input and output member.

11. A device according to claim 10 wherein the sleeves are provided with circumferential slots, and the input and the output member are provided with radial fingers respectively, and both extending through both of said notches, and the coil spring is operative for normally biasing the sleeves respectively into engagement with the fingers on the input and output members for normally maintaining a non-play engagement between said fingers and said sleeves.

* * * * *